(12) United States Patent
Mishra et al.

(10) Patent No.: US 11,405,216 B2
(45) Date of Patent: Aug. 2, 2022

(54) SYSTEM FOR AUTHENTICATING VERIFIED PERSONAL CREDENTIALS

(71) Applicant: ADP, Inc., Roseland, NJ (US)

(72) Inventors: Prateek Mishra, Roseland, NJ (US); Frank Villavicencio, Roseland, NJ (US); Merajuddin Mohammad, Parsippany, NJ (US)

(73) Assignee: ADP, Inc., Roseland, NJ (US)

(*) Notice: Subject to any disclaimer, the term of this patent is extended or adjusted under 35 U.S.C. 154(b) by 70 days.

(21) Appl. No.: 16/869,345

(22) Filed: May 7, 2020

(65) Prior Publication Data
US 2021/0351935 A1 Nov. 11, 2021

(51) Int. Cl.
H04L 29/06 (2006.01)
H04L 9/32 (2006.01)
H04L 9/08 (2006.01)
G06F 21/31 (2013.01)
H04L 9/06 (2006.01)

(52) U.S. Cl.
CPC ............ *H04L 9/3247* (2013.01); *G06F 21/31* (2013.01); *H04L 9/0637* (2013.01); *H04L 9/0825* (2013.01); *G06F 2221/2101* (2013.01)

(58) Field of Classification Search
CPC ... H04L 9/3247; H04L 9/0637; H04L 9/0825; H04L 2209/38; H04L 9/3239; G06F 21/31; G06F 2221/2101; G06F 21/6245; G06F 21/64
See application file for complete search history.

(56) References Cited

U.S. PATENT DOCUMENTS

| | | | | |
|---|---|---|---|---|
| 9,087,187 B1* | 7/2015 | Doane | .................. | H04L 63/083 |
| 9,300,643 B1* | 3/2016 | Doane | .................. | H04L 63/08 |
| 9,374,221 B1* | 6/2016 | Juels | ..................... | H04L 9/0897 |
| 2016/0218875 A1* | 7/2016 | Le Saint | ............. | H04L 63/0435 |
| 2020/0257780 A1* | 8/2020 | Feng | ........................ | G06F 21/31 |
| 2020/0259815 A1* | 8/2020 | Caceres | .................. | G06F 21/45 |
| 2021/0351935 A1* | 11/2021 | Mishra | .................... | G06F 21/64 |

FOREIGN PATENT DOCUMENTS

| | | | | |
|---|---|---|---|---|
| CA | 2864535 A1 * | 8/2013 | ............. | G06F 21/31 |
| CA | 3068090 A1 * | 2/2019 | ............. | G06F 21/36 |
| WO | WO-2018157782 A1 * | 9/2018 | ........ | H04L 63/0823 |
| WO | WO-2020222777 A1 * | 11/2020 | ............. | G06Q 20/12 |

* cited by examiner

Primary Examiner — Sher A Khan
(74) Attorney, Agent, or Firm — Yee & Associates, P.C.

(57) ABSTRACT

A method, apparatus, system, and computer program product are provided for managing the usage of verified credentials. An issuer of credentials receives a request from a person for a credential. The issuer identifies the credential from information that is controlled by the issuer. The issuer identifies a decentralized identifier (DID) record for an audit engine from a blockchain network. The DID record for the audit engine includes a public key of that is associated with the audit engine. The issuer identifies a DID record for the person from the blockchain network. The DID record for the person includes a public key that is associated with the person. The issuer generates an encrypted credential by encrypting the credential and the DID record for the person based on the public key associated with the audit engine. The issuer sends the encrypted credential to the person.

18 Claims, 8 Drawing Sheets

SYSTEM FOR AUTHENTICATING VERIFIED PERSONAL CREDENTIALS

BACKGROUND INFORMATION

1. Field

The present disclosure relates generally to an improved system and method, which can be embodied in an apparatus, computer system, or computer program product, for managing the usage of verified credentials.

2. Background

Modern service providers offer services and software solutions for a wide variety of customers. For example, many forms of software are provided as a service for a fee. Access to the software is usually accomplished via the Internet or other network connection after proper authentication has been established. However, customers are demanding not only more complex services, but greater flexibility in accessing these services. In some cases, authorization of a third party via an authorized primary contracting party to access the service can be difficult. Indirect relationships among customers and the provider can cause undesirable authorization problems. Thus, methods and devices are needed to improve authorization and communication between indirectly related parties via networked computing systems.

SUMMARY

An embodiment of the present disclosure provides a credential management system comprising a computer system, a blockchain in the computer system, and an issuer of a credential interacting with the credential manager blockchain. The issuer operates to receive a request from a person. The request is for a credential of the person. The issuer operates to identify the credential from information that is controlled by the issuer. The issuer operates to identify a decentralized identifier (DID) record for an audit engine from a blockchain. The DID record for the audit engine includes a public key of a cryptographic key pair that is associated with the audit engine. The issuer operates to identify DID record for the person from the blockchain. The DID record for the person includes a public key of a cryptographic key pair that is associated with the person. The issuer operates to generate an encrypted credential by encrypting the credential and the DID record for the person based on the public key associated with the audit engine. The issuer operates to send the encrypted credential to the person.

Another embodiment of the present disclosure provides a method for managing usage of verified credential. An issuer of a credential receives a request from a person. The request is for a credential of the person. The issuer identifies the credential from information that is controlled by the issuer. The issuer identifies a decentralized identifier (DID) record for an audit engine from a blockchain network. The DID record for the audit engine includes a public key of a cryptographic key pair that is associated with the audit engine. The issuer identifies a DID record for the person from the blockchain network. The DID record for the person includes a public key of a cryptographic key pair that is associated with the person. The issuer generates an encrypted credential by encrypting the credential and the DID record for the person based on the public key associated with the audit engine. The issuer sends the encrypted credential to the person.

Still another embodiment of the present disclosure provides a computer program product for managing usage of a verified credential, the computer program product comprising a computer readable storage media with program code stored on the computer-readable storage media. The program code includes code for receiving a request from a person. The request is for a credential of the person. The program code includes code for identifying the credential from information that is controlled by the issuer. The program code includes code for identifying a decentralized identifier (DID) record for an audit engine from a blockchain network. The DID record for the audit engine includes a public key of a cryptographic key pair that is associated with the audit engine. The program code includes code for identifying a DID record for the person from the blockchain network. The DID record for the person includes a public key of a cryptographic key pair that is associated with the person. The program code includes code for generating an encrypted credential by encrypting the credential and the DID record for the person based on the public key associated with the audit engine. The program code includes code for sending the encrypted credential to the person.

Yet another embodiment of the present disclosure provides a credential management system comprising a computer system, a blockchain network in the computer system, and a relying party interacting with the manager blockchain. The relying party operates to receive encrypted credential and an encrypted key from a person. Both the encrypted credential and the encrypted key include a digital signature of an issuer of the credential. The relying party operates to identify a decentralized identifier (DID) record for the issuer from a blockchain network. The DID record for the issuer includes a public key of a cryptographic key pair associated with the issuer. The relying party operates to verify the digital signature of the issuer based on the public key associated with the issuer. The relying party operates to identify the credential by decrypting the encrypted credential based on a private key of a cryptographic key pair associated with an audit engine. The credential references a DID record for the person recorded in the blockchain network. The relying party operates to authenticate the person based on the DID record for the person. The issuer is unaware of the relying party, and of the public key of the cryptographic key pair that was used to generate the encrypted credential.

Another embodiment of the present disclosure provides a method for authenticating a credential of a person. A relying party receives an encrypted credential and an encrypted key from a person. Both the encrypted credential and the encrypted key include a digital signature of an issuer of the credential. The relying party identifies a decentralized identifier (DID) record for the issuer from blockchain network. The DID record for the issuer includes a public key of a cryptographic key pair associated with the issuer. The relying party verifies the digital signature of the issuer based on the public key associated with. The relying party identifies the credential by decrypting the encrypted credential based on the private key of a cryptographic key pair associated with an audit engine. The credential references a DID record for the person recorded in the blockchain network. The relying party authenticates the person based on the DID record for the person. The issuer is unaware of the relying party, and of the public key of the cryptographic key pair that was used to generate the encrypted credential.

Still another embodiment of the present disclosure provides a computer program product for authenticating a credential of a person, the computer program product comprising a computer readable storage media with program code stored on the computer-readable storage media. The program code includes code for receiving an encrypted credential and an encrypted key from a person. Both the encrypted credential and the encrypted key include a digital signature of an issuer of the credential. The program code includes code for identifying a decentralized identifier (DID) record for the issuer from a blockchain network. The DID record for the issuer includes a public key of a cryptographic key pair associated with the issuer. The program code includes code for verifying the digital signature of the issuer based on the public key associated with the issuer. The program code includes code for identifying the credential by decrypting the encrypted credential based on a private key of a cryptographic key pair associated with an audit engine. The credential references a DID record for the person recorded in the blockchain network. The program code includes code for authenticating the person based on the DID record for the person. The issuer is unaware of the relying party, and of the public key of the cryptographic key pair that was used to generate the encrypted credential.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
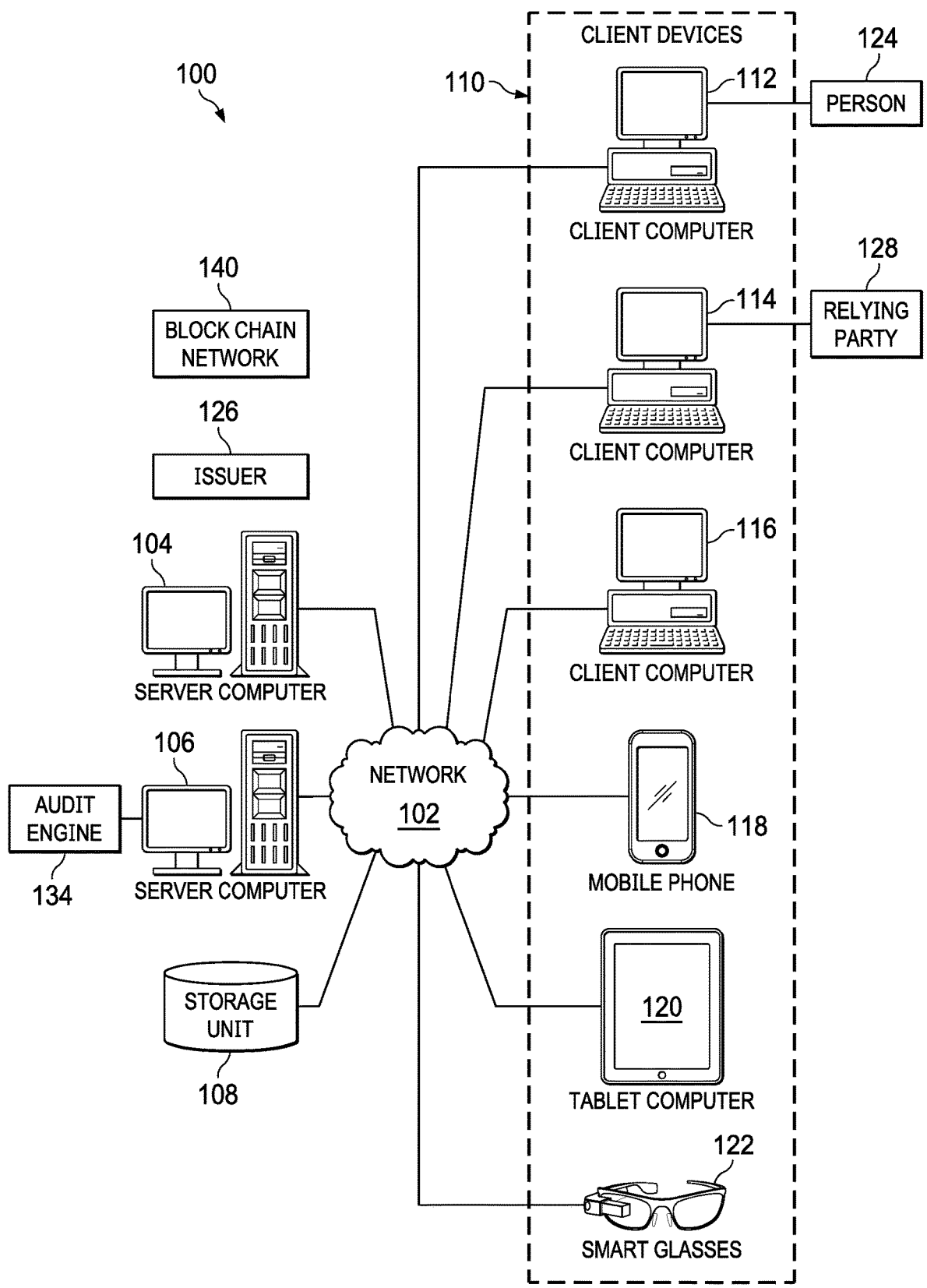
FIG. 1 is a pictorial representation of a network of data processing systems in which illustrative embodiments may be implemented.

The illustrative embodiments recognize and take into account one or more different considerations. For example, the illustrative embodiments recognize and take into account that Blockchain technology, when combined with the use of standards such as Decentralized Identifiers and Verified credentials, provides a means for credential issuers—third party entity that can verify assertions about a person- to provide credentials to persons, such that a person can fully control and manage the presentation of the credential to a relying party. The technology allows the relying party to determine the authenticity of the credential and whether it belongs to the person.

Further, the illustrative embodiments recognize and take into account the fact that, in the B2C market, businesses typically do not charge the consumer for obtaining credentials. Charging the consumer for obtaining credentials would stifle the creation of a large enough market that is needed before there is a consumer appreciation of the value of such a credential.

Further, the illustrative embodiments recognize and take into account the fact that the relying party is using the credential for business purposes. Even though the issuer is creating the credential for the person, the relying party receives a benefit of the credential provided by the issuer, such as providing a business service, based on the person's authenticated identity, to the person for which the relying party can receive compensation.

The illustrative embodiments also recognize and take into account that it would be desirable to support interactions between the relying party and the issuer for payment per-use of the credential. A system supporting these interactions can provide compensation for the work by the issuer, especially when the relying party provides a business service to the person based upon credentials provided by the issuer.

The illustrative embodiments also recognize and take into account that personal privacy is important in many transactions between a person and a relying party. Therefore, it would be desirable to support interactions between the relying party and the issuer in a manner that maintains privacy of a person's interactions, and does not permit the issuer to track identities of relying parties or where the person is using the credential.

The illustrative embodiments provide a method, apparatus, system, and computer program product for managing the usage of verified credentials. An illustrative example described herein provides a computer system, including an issuer of credentials. The issuer receives a request from a person. The request is for a credential of the person. The issuer identifies the credential from information that is controlled by the issuer. The issuer identifies a decentralized identifier (DID) record for an audit engine from a blockchain network. The DID record for the audit engine includes a public key of a cryptographic key pair that is associated with the audit engine. The issuer identifies a DID record for the person from the blockchain network. The DID record for the person includes a public key of a cryptographic key pair that is associated with the person. The issuer generates an encrypted credential by encrypting the credential and the DID record for the person based on the public key associated with the audit engine. The issuer sends the encrypted credential to the person.

Further, the illustrative embodiments provide a method, apparatus, system, and computer program product for authenticating the credentials of a person. An illustrative example described herein provides a computer system, including a relying party. The relying party receives an encrypted credential and an encrypted key from a person. Both the encrypted credential and the encrypted key include a digital signature of an issuer of the credential. The relying party identifies a decentralized identifier (DID) record for the issuer from a blockchain network. The DID record for the issuer includes a public key of a cryptographic key pair associated with the issuer. The relying party verifies the digital signature of the issuer based on the public key associated with. The relying party identifies the credential by decrypting the encrypted credential based on a private key of a cryptographic key pair associated with an audit engine. The credential references a DID record for the person recorded in the blockchain network. The relying party authenticates the person based on the DID record for the person. The issuer is unaware of the relying party. The issuer is unaware of the public key of the cryptographic key pair that was used to generate the encrypted credential.

Implementations of the illustrative examples described herein allows the relying party to determine the authenticity of the credential and whether it belongs to the person. Implementations of the illustrative examples described herein supports payment interactions to the issuer for per-use of the credential by the relying party. Implementations of the illustrative examples support interactions between the relying party and the issuer in a manner that maintains privacy of a person's interactions, and does not permit the issuer to track identities of relying parties or where the person is using the credential.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, a person at client computer 112 can send a request for credentials to issuer at server computer 104. The issuer can return a response to the person in response to receiving the request. The response contains an encryption of the credential requested by the person.

As used herein, a "person" is a natural person with access to client computer 112; actions performed by or directed to a "person" are understood to be performed by the associated computer system that person is interacting with, such as client computer 112.

As used herein, an "issuer" is an entity with the ability to issue credentials that can verify assertions about a person. For example, an issuer may be an employer, payment service, school or service, credit reporting service or custodian of employment records. actions performed by or directed to an "issuer" are understood to be performed by an issuer-controlled computer system or application running thereon, such as server computer 104.

In this illustrative example, audit engine 134 is located in server computer 106. As depicted, audit engine 134 operates to track usage of credentials to authenticate a person at a relying party. Audit engine 134 is independent of both the relying party and the issuer. Audit engine 134 provides the issuer with an audit log that lists the transactions originating from the relying party. The audit log provides a basis for the issuer billing the relying party.

As used herein, a "relying party" is an entity that provides a business service to a person, utilizing one or more credentials obtained from an issuer. For example, a relying party may be a government agency, financial institution or prospective employer. actions performed by or directed to a "relying party" are understood to be performed by a relying party-controlled computer system or application running thereon, such as client computer 114.

Each of person, issuer, and relying party are registered participants in blockchain network 140. blockchain network 140 is a distributed ledger based on blockchain technology that can hold information about person 124, issuer 126, relying party 128 and audit engine 134 based on distributed identification records with privacy, security and integrity guarantees. The blockchain network 140 includes governance rules for all participants in the network (issuer(s), person(s), relying party(s), audit engine). These rules would ensure that only registered participants are able to interact with each other.

Blockchain network provides a trust anchor or reference point which can be shared by the network participants. Blockchain network 140 is used to establish trust between person 124 and the relying party 128. Unlike other blockchain technologies (e.g., Sovrin, Fabric, Ethereum), blockchain network 140 does not require the use of a utility coin or internal currency controlled by blockchain network 140. Payment protocol is facilitated by audit engine 134, and is kept separate from the functioning of blockchain network 140.

Blockchain stores decentralized identifiers for each of the network participants, including issuer 126, person 124, relying party 128, and audit engine 134. Decentralized identifiers are identifiers implemented independently of any centralized registry, identity provider, or certificate authority. Decentralized identifiers provide a verifiable, decentralized digital identity, allowing trustable interactions with the identity holder. Decentralized identifier are typically URLs, or more generally, URIs.

Audit engine 134 facilitates the management and authentication of verified credentials that can be exchanged between participants in the block chain network 140. In this illustrative example, the audit engine 134 and decentralized identifier stored in blockchain network 140 enable interactions between the relying party 128 and issuer 126 for payment per-use of the credential. As a result, a service for interactions between the relying party 128 and issuer 126 for payment per-use of the credential can be performed based on audit engine 134 and blockchain network 140.

In this the illustrative example in figure, audit engine 134 and blockchain network 140 provides a means for issuer 126 to provide verifiable credentials about a person 124, such that person 124 can fully control and manage the presentation of the credential to relying party 128. Using decentralized identifiers recorded in the block chain network 140, relying party 128 can determine the authenticity of the credential and whether it belongs to person 124.

Further, audit engine 134 and blockchain network 140 support interactions between the relying party 128 and issuer 126 for payment per-use of the credential. audit engine 134 and blockchain network 140 support interactions between the relying party 128 and issuer 126 in a manner that maintains privacy of interactions by person 124, and does not permit the issuer 126 to track identities of relying party 128 or where person 124 is using the credential.

Figure 2:
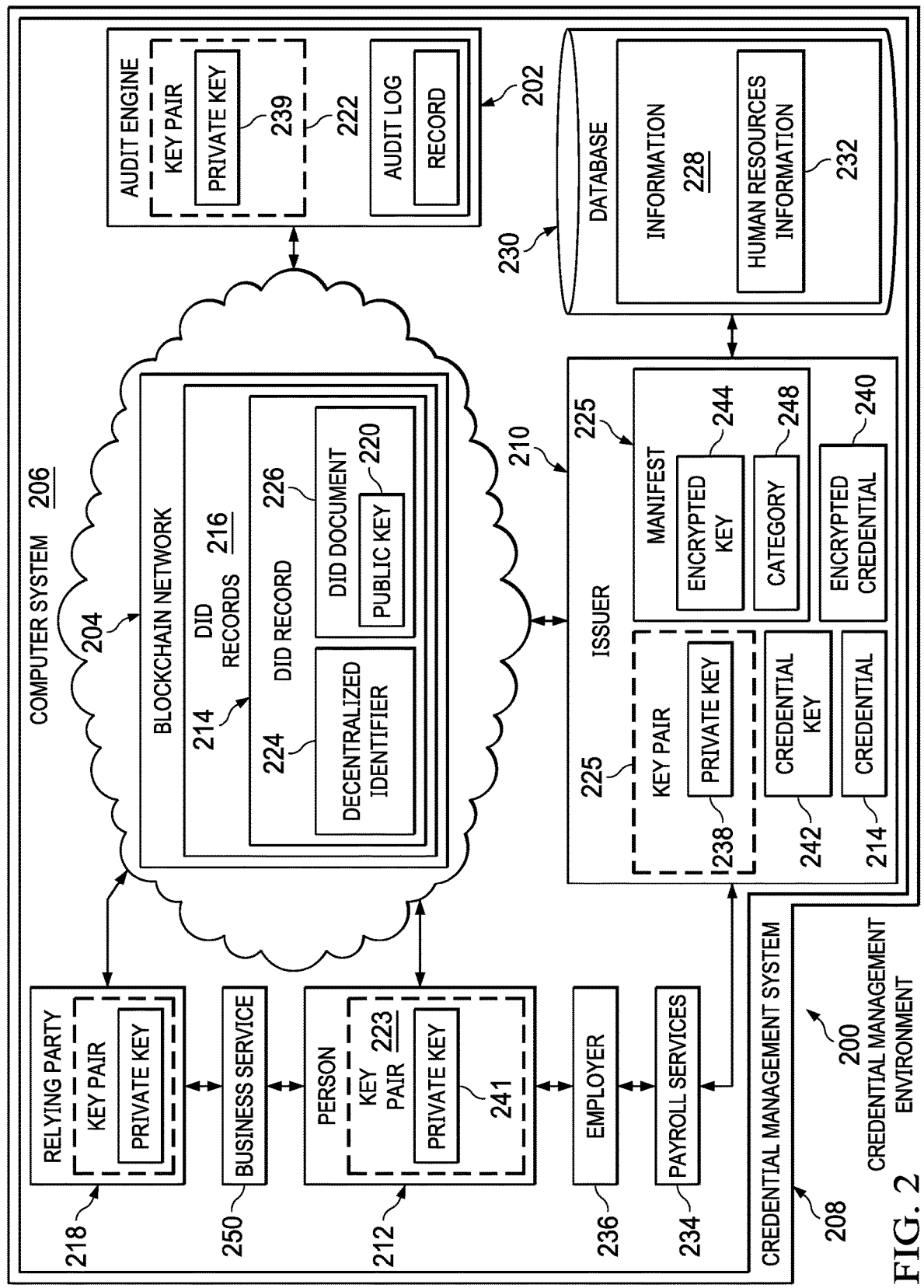
FIG. 2 is a block diagram of a credential management environment depicted in accordance with an illustrative embodiment.

With reference now to FIG. 2, a block diagram of a credential management environment is depicted in accordance with an illustrative embodiment. In this illustrative example, credential management environment 200 includes components that can be implemented in hardware such as the hardware shown in network data processing system 100 in FIG. 1.

As depicted, credential management environment 200 is an environment in which audit engine 202 and blockchain network 204 in computer system 206 support interactions between the relying party 218 and issuer 210 for payment per-use of the credential.

Computer system 206 is a physical hardware system and includes one or more data processing systems. When more than one data processing system is present in computer system 206, those data processing systems are in communication with each other using a communications medium. The communications medium may be a network. The data processing systems may be selected from at least one of a computer, a server computer, a tablet, or some other suitable data processing system.

In this illustrative example, audit engine 202 202, blockchain network 204, and computer system 206 form credential management system 255. Through interactions with blockchain 204, audit engine 202 can support interactions between the relying party 218 and issuer 210 for payment per-use of the credential.

Audit engine 202 can be implemented in software, hardware, firmware, or a combination thereof. When software is used, the operations performed by audit engine 202 can be implemented in program code configured to run on hardware, such as a processor unit. When firmware is used, the operations performed by audit engine 202 can be implemented in program code and data and stored in persistent memory to run on a processor unit. When hardware is employed, the hardware may include circuits that operate to perform the operations in audit engine 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In an illustrative example, issuer 210 receives a request from person 212 for credential 214 of person 212. Issuer 210 is issuer 210 of credential 214. Credential 214 is set of one or more assertions regarding a qualification, an achievement, person 212, a quality, or some other aspect of person 212. A verifiable credential is a set of tamper-evident claims and metadata that cryptographically prove who issued it.

The request can be, for example, a JSON object such as:

```
{"iss": "https://employment-recorder.com",
    "credCategory" : "BasicIVCreds",
    "key": <base64url encoding of credential encryption key encrypted using E_PUB>
}
```

Issuer 210 can receive the request in a number of different ways. For example, Person 212 interacts with issuer 210 (e.g., a payroll processor or employer) and requests a credential (e.g., information 228 about recent employment or educational qualifications). Typically, these relationships exist prior to this flow based on business relationships (e.g., employment, education). Using well-known authentication techniques, issuer 210 ensures that person 212 is asking for their own information 228. This can be accomplished, for example, by person 212 visiting issuer 210's website and logging onto their system.

blockchain network 204 stores DID records 216 for each of the network participants, including issuer 210, person 212, relying party 218, and audit engine 202. Each DID record 214 includes public key 220 of a cryptographic key pair 222 that is associated with the network participant. For example, when the DID record 214 is for the audit engine 202, DID record 214 includes public key 220 corresponding to a cryptographic key pair 222 that is associated with the audit engine 202.

In this illustrative example, issuer 210 identifies a decentralized identifier (DID) record 214 for an audit engine 202 from blockchain network 204. DID 224 and DID record 214 of audit engine 202 is known to all participants on the blockchain network 204. By reference to DID 224, participants in blockchain network 204 can access services provided by audit engine 202, as indicated in an associated DID document 226.

In this illustrative example, issuer 210 identifies DID record 214 for person 212 from the blockchain. DID record 214 for person 212 includes public key 220 of a cryptographic key pair 223 that is associated with person 212.

In this step, issuer 210 ensures that there is DID record 214 and DID 224 available for person 212. This can take many forms. For example, person 212 may provide an existing DID 224 on the blockchain network 204, on another blockchain network, or request creation of DID record 214 with a new DID on the blockchain network 204.

In this illustrative example, issuer 210 generates the credential 214 from information 228. In one illustrative example, the credential 214 can be a JSON object, such as:

```
{
    "sub": "did:example:ebfeb1f712ebc6f1c345e12ec21",
    "jti ": "http://employment-recorder.com/eviv/373192",
    "iss" : "https://employment-recorder.com",
    "nbf": 1541243724,
    "iat": 1541424724,
    "exp": 1573029723,
    "nonce": " 660$7345FSer",
    "vc": {
        "@context": [
            "https://www.w3.org/2018/credential/v1",
            "https://www.employment-recorder.com/2020/eviv/v1"
        ],
        "type": ["VerifiableCredential", "EVIVCredential"],
        "credential 214ubject": {
            "salary": {
                "employer":"MonsterCorp","year": "2018",
                "totalComp": "$120, 000", "BiweeklyRate" : "$3000.00"
            }
        }
    }
}
```

Information 228 is information 228 that is controlled by issuer 210. For example, information 228 can be stored in database 230, with the access to database 230 being controlled by issuer 210.

In this illustrative example, information 228 may be generated in association with services provided by issuer 210. For example, information 228 may include human resources information. 232 generated in providing payroll services 234 to employer 236. Employer 236 can be an employer of person 212. DID 224 of person 212 is included in the credential 214 provided by issuer 210. Issuer 210 digitally sigs the credential 214 using private key 238 of a cryptographic key pair 225 associated with issuer 210.

In this illustrative example, issuer 210 generates encrypted credential 240. Issuer 210 encrypts credential 214 and DID record 214 for person 212 based on the public key 220 associated with key pair 222 of audit engine 202.

In one illustrative example, generating encrypted credential 240 may include generating credential key 242. credential key 242 may be an AES 256 encryption key based upon a cryptographically secure pseudorandom number generator (CSPRNG). In one illustrative example, credential key 242 is a one-time-use key that can only be used for decryption of a single credential—even if exposed or retained by audit engine 202 or relying party 218.

Issuer 210 in generates encrypted credential 240 by encrypting credential 214 using credential key 242. Issuer 210 then encrypts credential key 242 using public key 220 associated with key pair 222 of audit engine 202, thereby generating an encrypted key 244. In this manner, the encryption of credential 214 is based on, at least in part, public key 220 associated with audit engine 202.

In the illustrative example above, the JSON object for credential 214 is digitally signed, and encrypted, to create the encrypted credential 240 object:

```
ENC[
SIGN[
{
    "sub": "did:example:ebfeb1f712ebc6f1c345e12ec21",
    "jti": "http://employment-recorder.com/eviv/373192",
    "iss": "https://employment-recorder.com",
    "nbf": 1541243724,
    "iat": 1541424724,
    "exp": 1573029723,
    "nonce": " 660$7345FSer",
    "vc": {
    "@context": [
    "https://www.w3.org/2018/credential/v1",
    "https://www.employment-recorder.com/2020/eviv/v1"
    ],
    "type": ["VerifiableCredential", "EVIVCredential"],
    "credential 214ubject": {
    "salary": {
    "employer":"MonsterCorp","year": "2018",
    "totalComp": "$120, 000", "BiweeklyRate" : "$3000.00"
    }
    }
}
```

-continued

```
    }
  WITH S_PRIV]
WITH CEK]
```

In one illustrative example, issuer 210 generates manifest 246, 244. Manifest 246 includes encrypted key 244, an identity of issuer 210, and a category for credential. Issuer 210 digitally signs manifest 246 using private key 238 of cryptographic key pair 222 associated with issuer 210.

In one illustrative example, manifest 246 can be a JSON object, such as:

```
SIGN[
{"iss": "https://employment-recorder.com",
    "credCategory" : "BasicIVCreds",
    "key": <base64url encoding of credential encryption key
encrypted using E_PUB>
}
] WITH S_PRIV
```

Issuer 210 then sends the encrypted key 244 to person 212 in manifest 246.

In the object above, manifest 246 carries information about category 248—"credCategory"—indicating the class of credential 214 involved, shown here as "BasicIVCreds". Indicating category 248 for credential 214 allows issuer 210 to implement different price structures based on the type of credential 214 requested.

In this illustrative example, issuer 210 then sends encrypted credential 240 to person 212. Additionally, issuer 210 can also send encrypted key 244 to person 212. Because DID record 214 includes person 212's public key 220, person 212 can prove to relying party 218 that they are entity referenced by a particular one of DID records 216, and, transitively, that credential 214 provided by issuer 210 to person 212 is authentic and references person 212.

In another illustrative example, relying party 218 receives encrypted credential 240 and encrypted key 244 from person 212. Both encrypted credential 240 and encrypted key 244 include a digital signature of issuer 210 of credential 214. encrypted key 244 can be received as part of manifest 246.

In this illustrative example, relying party 218 identifies a decentralized identifier (DID) record for issuer 210 from blockchain network 204. DID record 214 for issuer 210 includes public key 220 of a cryptographic key pair 225 associated with issuer 210. Relying party 218 verifies the digital signature of issuer 210 based on public key 220 of key pair 225 associated with issuer 210.

In this illustrative example, relying party 218 identifies credential 214 by decrypting encrypted credential 240 based on private key 239 of a cryptographic key pair 222 associated with an audit engine 202. Credential 214 reference DID record 214 for person 212 recorded in blockchain network 204.

Relying party 218 provides manifest 246 to audit engine 202 over an authenticated channel. Audit engine 202 may even require manifest 246 to be additionally signed by relying party 218 to support non-repudiation.

Audit engine 202 uses private key 239 to decrypt encrypted key 244 found in manifest 246. Audit engine 202 returns the plaintext credential key 242 to relying party 218 over a secure channel.

Audit engine 202 has standard security measures to ensure that audit record is protected from tampering or deletion Relying party 218 decrypts encrypted credential 240 provided using credential key 242 return from audit engine 202. Using public key 220 of issuer 210, relying party 218 validates issuer's 210 signature over credential 214.

In this illustrative example, relying party 218 authenticates person 212 based on DID record 214 for person 212. For example, it uses the DID entry (value of "sub" field) in the credential to identifying DID record 214 for person 212 in blockchain network 204 retrieve DID record 214 from blockchain network 204. DID record 214 for person 212 includes public key 220 of a cryptographic key pair 223 associated with person 212.

It further interacts with person 212 in an authentication exchange (DID Auth) wherein person 212 proves possession of private key 241. For example, relying party 218 sends a challenge request to person 212. The challenge request is generated based on public key 220 associated with person 212. The challenge response is generated based on private key 241 of key pair 223 associated with person 212, and sends the response back to relying party 218.

Relying party 218 can authenticate person 212 based on the receipt of a challenge response that successfully indicates possession of the corresponding private key 241 of key pair 223 associated with person 212.

In this manner, issuer 210 is unaware of relying party 218. Furthermore, issuer 210 is unaware of public key 220 of the cryptographic key pair 239 associated with audit engine 202 that was used to generate encrypted credential 240.

In one illustrative example, relying party 218 provides a business service 250 to person 212 in response to authenticating person 212. relying party 218 provides the business service 250 according to verified credential 214 that were provided by person 212.

Audit engine 202 facilitates the management and authentication of verified credential 214 that can be exchanged between person 212, issuer 210, and relying party 218. In this illustrative example, audit engine 202 and decentralized identifier stored in blockchain network 204 enable interactions between relying party 218 and issuer 210 for payment per-use of credential 214. As a result, a service for interactions between relying party 218 and issuer 210 for payment per-use of credential 214 can be performed based on audit engine 202 in blockchain network 204.

In this illustrative example, audit engine 202 and blockchain network 204 provides a means for issuer 200 can-third party entity that can verify assertions about person 212 to provide credential 214 to person 212, such that person 212 can fully control and manage the presentation of credential 214 to relying party 218. Using DID records 216, relying party 218 can determine the authenticity of credential 214 and whether it belongs to person 212.

Further, audit engine 202 and blockchain network support interactions between relying party 218 and issuer 210 for payment per-use of the credential. audit engine 202 and blockchain network 204 support interactions between relying party 218 and issuer 210 in a manner that maintains privacy of interactions between person 212, and relying party 218, and does not permit issuer 210 to track of usage of credential 214 or the identity of person 212 using credential 214.

Figure 3:
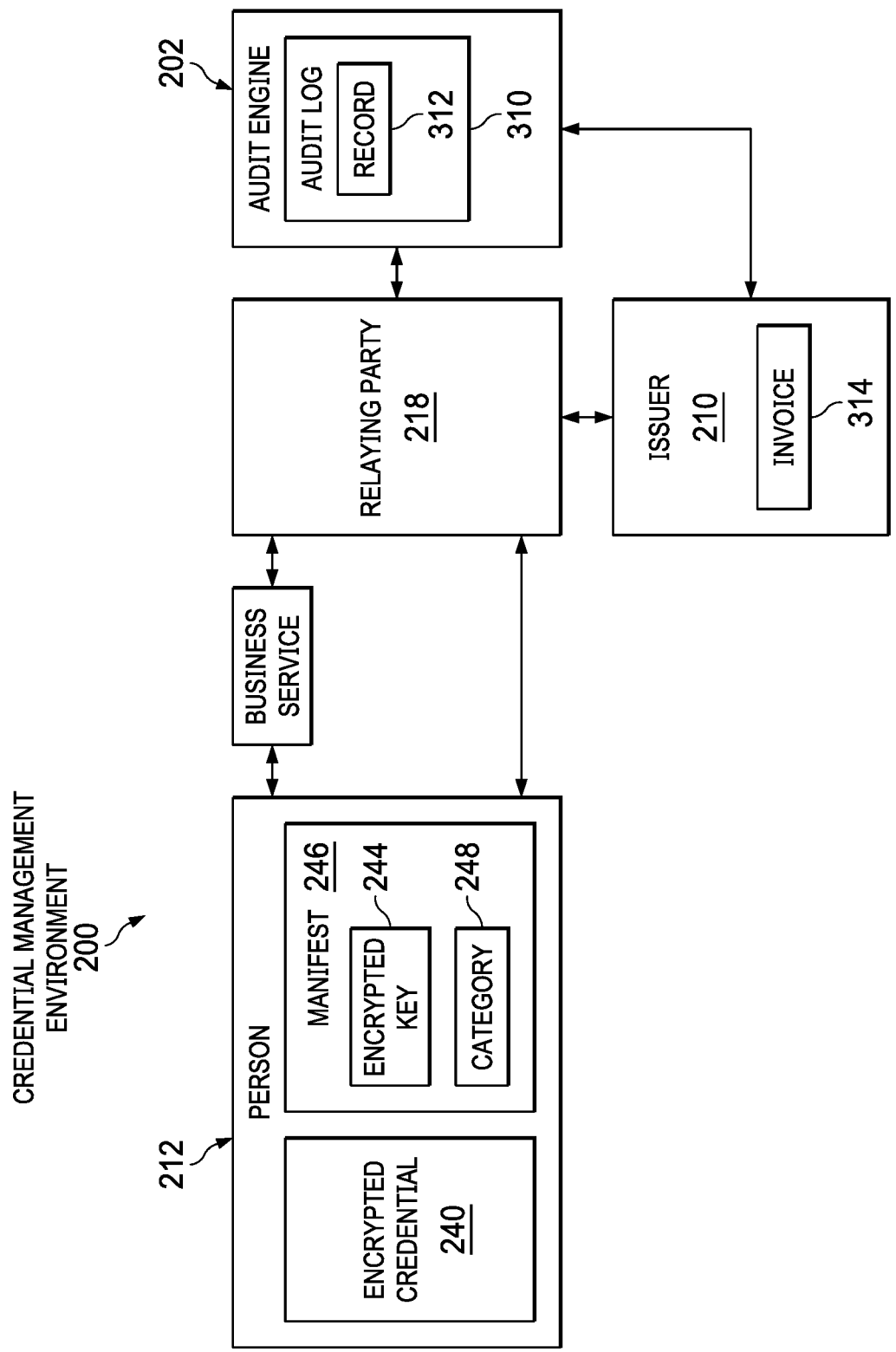
FIG. 3 is a data flow diagram illustrating data flow used to generate an invoice based on credential usage depicted in accordance with an illustrative embodiment.

With reference next to FIG. 3, a data flow diagram illustrating data flow used to generate an invoice based on credential usage is depicted in accordance with an illustrative embodiment. In the illustrative examples, the same reference numeral may be used in more than one figure. This reuse of a reference numeral in different figures represents the same element in the different figures.

In this illustrative example, audit engine 202 operates to generate an audit log 310. In this illustrative example, audit engine 202 receives manifest 246 from relying party 218 over an authenticated channel. Audit engine 202 uses its own private key to decrypt the credential key from the encrypted key found in manifest 246. Audit engine 202 creates an audit record 312 of transaction, and returns the plaintext key to relying party 218 over the secure channel.

Receiving, by issuer 210, an audit log from audit engine 202, wherein the audit log provides a record of manifest 246 received by audit engine 202 from relying party 218, audit engine 202 provides issuer 210 with an audit log 310 that includes audit records 312 for the transactions performed.

In one illustrative example, audit log 310 can be a JSON object, that includes one or more audit record 312 such as: [<Timestamp>, Relying party 218 Identifier, Manifest 246]

The audit record 312 includes an identity of relying party 218 and manifest 246. These records have the property that manifest 246 references issuer 210 via the "iss" field, that provides a non-repudiable record of a transaction at audit engine 202, wherein relying party 218 has requested the decryption of a content encryption key.

No information 228 about person 212 is provided to issuer 210 at this step. We mandate that manifest 246 carry no personal identifying information or identifier that issuer 210 can use to specifically identify person 212.

Based on audit record 312, issuer 210 can invoice relying party 218 for the business service provided by the credential issued to the user. Issuer 210 generates invoice 314 for information 228 provided by issuer 210 in authenticating person 212. Invoice 314 is generated based on the audit log 310 received from audit engine 202

Manifest 246, which is in audit record 312, carries information about the "credCategory"—indicating the class of credential 214 involved. In the object above, manifest 246 carries information about the "credCategory"-indicating the class of credential 214 involved, shown here as "BasicIVCreds". Indicating a category for the credential allows issuer 210 to implement different price structures based on the type of credential 214 requested.

Issuer 210 sends invoice 314 to relying party 218. In one illustrative example, relying party 218 provides a business service according to the verified credential 214 that were provided by person 212. Audit log 310 that is received from audit engine 202 provides a basis for issuer 210 billing relying party 218.

Figure 4:
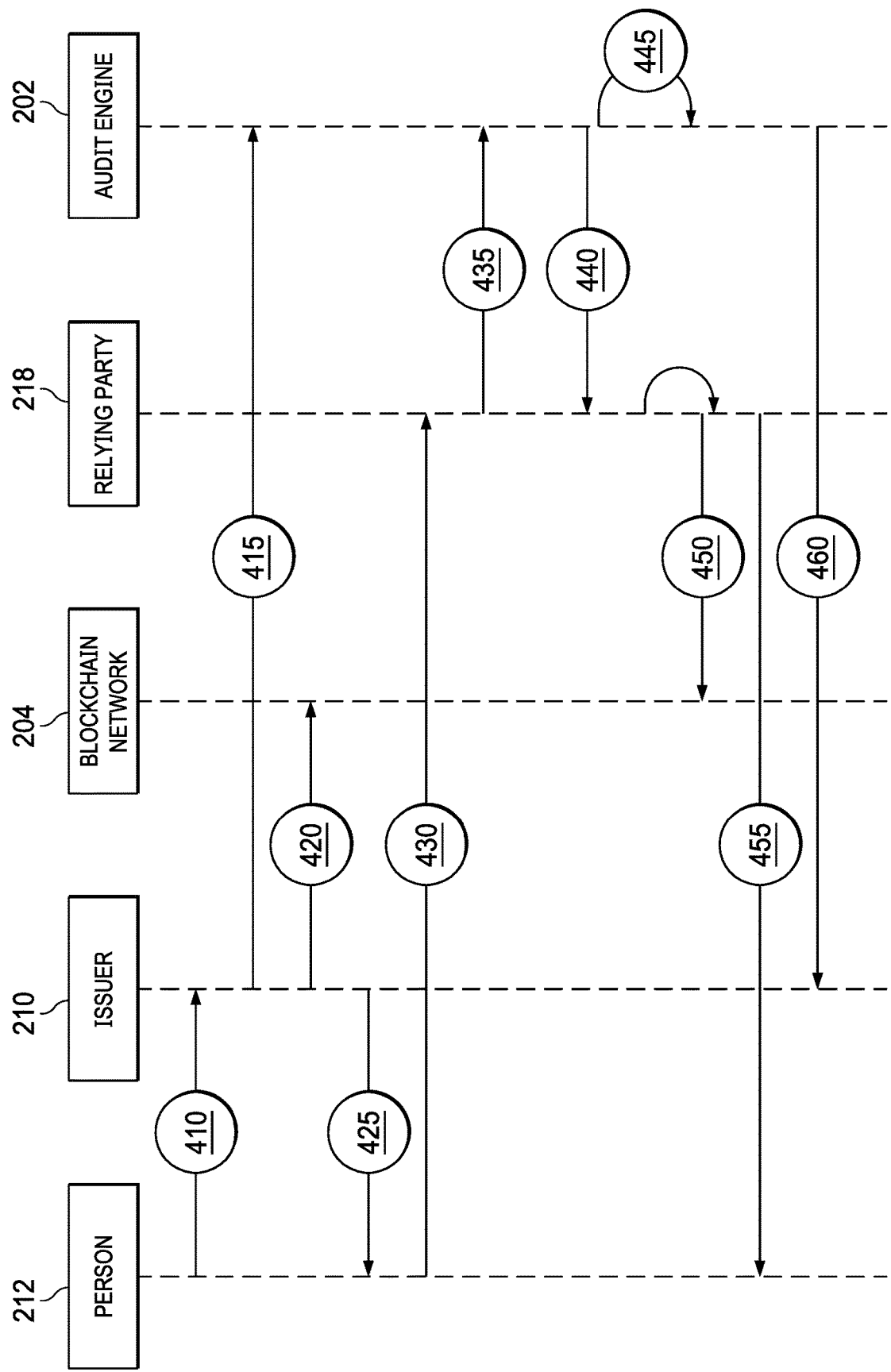
FIG. 4 is a data flow diagram illustrating data flow used to send the encrypted key in a manifest depicted in accordance with an illustrative embodiment

With reference next to FIG. 4, a data flow diagram illustrating data flow used to send the encrypted key in a manifest is depicted in accordance with an illustrative embodiment. In the illustrative examples, the same reference numeral may be used in more than one figure. This reuse of a reference numeral in different figures represents the same element in the different figures.

At step 410, person 212 interacts with issuer 210 (e.g., a payroll processor or employer) and requests a credential (e.g., information 228 about recent employment or educational qualifications). This would be accomplished by visiting issuer 210's website and logging onto their system.

Issuer 210 ensures that person 212 is asking for their own information 228 (using well-known authentication techniques). Typically, these relationships exist prior to this flow based on business relationships (e.g., employment, education).

At step 415, issuer 210 contacts audit engine 202 and obtains a public key associated with the audit engine 202. Issuer 210 can obtain the public key and associated endpoint listed in a DID document for audit engine 202, recorded and block chain network 204.

At step 420, issuer 210 obtains or creates DID for person 212 on blockchain network 204.

The role of the blockchain network 204 is to provide a trust anchor or reference point which can be shared by the network participants. In this step, issuer 210 ensures that there is DID record 214 and DID (identifier) available for person 212.

Issuer 210 generates an AES 256 encryption key based upon a CSPRNG (cryptographically secure pseudorandom number generator) which we will refer to as the credential encryption key (CEK). Issuer 210 encrypts the credential key using the public key associated with the audit engine 202. Issuer 210 signs both the credential and the encrypted key using the private key associated with issuer 210. At step 425, issuer 210 returns the credential, encrypted with the public key of audit engine 202, and the encrypted key. These data objects are returned to person 212.

At step 430, person 212 presents the encrypted credential and manifest 246 to relying party 218 and requests the desired business service. For example, a person may obtain their employment data as a credential, including information W-2s, payrate and compensation rate for previous two years. The person may then present this information to several mortgage loan service providers, i.e., relying parties, to obtain to obtain a mortgage with a competitive rate.

Relying party 218 validates issuer 210 signature on manifest 246, using public key associated with the issuer 210, which is available from blockchain network 204.

At step 435, relying party 218 provides manifest 246 to audit engine 202 over an authenticated channel. Audit engine 202 may even require manifest 246 to be additionally signed by relying party 218, to support non-repudiation.

Audit engine 202 uses its own private key to decrypt the credential encryption key and found in Manifest 246 and returns the plaintext key to relying party 218 over a secure channel at step 440. At step 445, audit engine 202 creates an audit record based on the manifest received from the relying party 218.

At step 450, relying party 218 decrypts the credential provided using the credential key. Further, relying party 218 uses the DID entry in the credential to retrieve the DID record for issuer 200 can from the blockchain 204. The DID record holds public key for the key pair associated with the issuer 210. Using the public key, relying party 218 validates issuer 210 signature over the credential, providing assurances that person 212 is the authentic subject of the credential.

At step 455, relying party 218 can provide business service to person 212 if credential is acceptable. For example, once the credential has been validated by relying party 218, it can provide the requested business service to person 212, provided any other business requirements are fulfilled.

At step 460, audit engine 202 provides issuer 210 with audit records of calls from relying party 218. These records provide a non-repudiable record of a transaction at audit engine 202, wherein relying party 218 has requested the decryption of a content encryption key.

Furthermore, the manifest provided to audit engine 200 to carries information indicating the class of credential involved. This class of credentials, provides a basis for issuer 210 to invoice relying party 218 for the business service provided by the type of information required.

In one illustrative example, one or more technical solutions are present that overcome a technical problem with maintaining digital identities and providing authenticated credentials for the person. As a result, one or more technical solutions can provide a technical effect of managing the usage of verified credentials, and providing verified credentials in support of business services compared to current techniques. One or more technical solutions allow a relying party to determine the authenticity of the credential and whether it belongs to person. One or more technical solutions also supports payment interactions to issuer 210 for per-use of the credential by the relying party 218 One or more technical solutions also supports verifying the digital credentials In a manner that maintains privacy of person 212's interactions, and does not permit issuer 210 to track identities of relying parties or where person 212 is using the credential.

Computer system 206 can be configured to perform at least one of the steps, operations, or actions described in the different illustrative examples using software, hardware, firmware, or a combination thereof. As a result, computer system 206 operates as a special purpose computer system in which audit engine 202 and decentralized identity records 216 in computer system 206 enables managing the usage of verified credentials, and providing verified credentials in support of business services. In particular, audit engine 202 transforms computer system 206 into a special purpose computer system as compared to currently available general computer systems that do not have audit engine 202.

In the illustrative example, the use of audit engine 202 in computer system 206 integrates processes into a practical application for to provide verified credentials in support of business services that increases the performance of computer system 206 in providing credentials 214 using. Block chain network 204 and distributed identification records 216 using audit engine 202 to managing the usage of verified credentials.

Further, audit engine 202 facilitates the management and authentication of verified credential 214 that can be exchanged between person 212, issuer 210, and relying party 218. In this illustrative example, audit engine 202 and decentralized identifier stored in blockchain network 204 enable interactions between relying party 218 and issuer 210 for payment per-use of credential 214. As a result, a service for interactions between relying party 218 and issuer 210 for payment per-use of credential 214 can be performed based on audit engine 202 in blockchain network 204.

Audit engine 202 and blockchain network 204 provides a means for issuer 210 to a third party entity that can verify assertions about person 212 to provide credential 214 to person 212, such that person 212 can fully control and manage the presentation of credential 214 to relying party 218. Using DID records 216, relying party 218 can determine the authenticity of credential 214 and whether it belongs to person 212.

In other words, audit engine 202 in computer system 206 is directed to a practical application of processes integrated into in computer system 206 that managing the usage of verified credentials, and providing verified credentials in support of business services.

The illustration of credential management environment 200 in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 5:
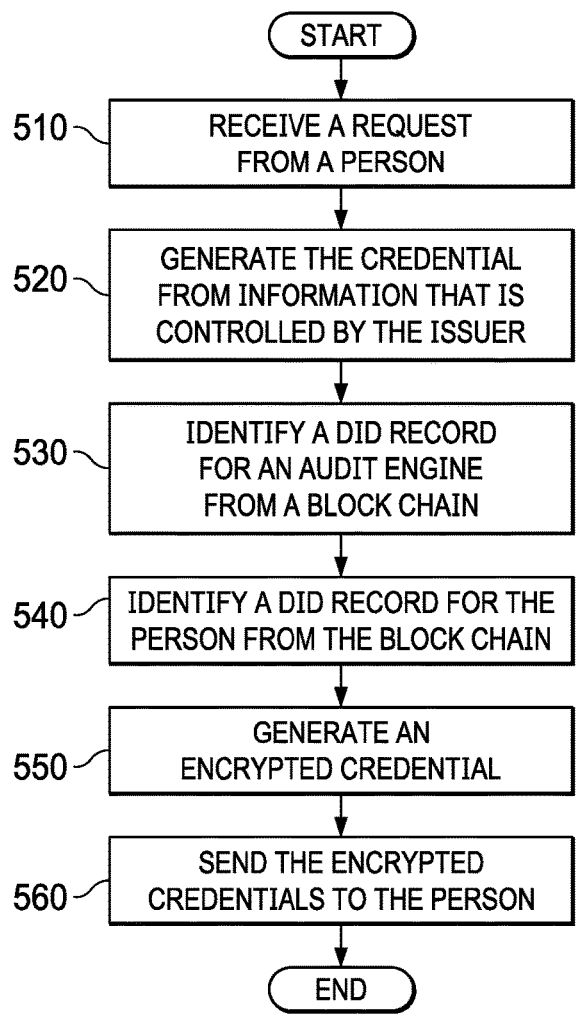
FIG. 5 is a flowchart of a process for providing verified credential depicted in accordance with an illustrative embodiment.

Turning next to FIG. 5, a flowchart of a process for providing verified credential is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in issuer 210 in computer system 206 in FIG. 2.

The process begins by receiving a request from a person (step 510). The request is for a credential for the person, such as credential 214 of FIG. 2.

The process generates the credential from information that is controlled by the issuer (step 520). In one illustrative example, the information comprises human resources information generated in connection with payroll services provided by issuer to an employer of the person.

The process identifies a decentralized identifier (DID) record for an audit engine from a blockchain (step 530). The DID record for the audit engine includes a public key of a cryptographic key pair that is associated with the audit engine.

The process identifies a DID record for the person from the blockchain (step 540). The DID record for the person includes a public key of a cryptographic key pair that is associated with the person.

The process generates an encrypted credential by encrypting the credential and the DID record for person based on the public key associated with the audit engine (step 550).

The process sends the encrypted credential to the person (step 560), with the process terminating thereafter.

Figure 6:
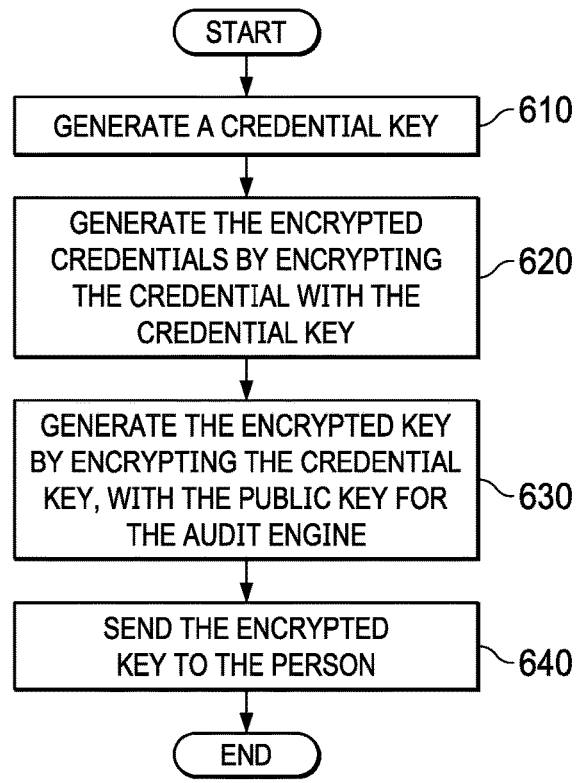
FIG. 6 is a flowchart of a process for generating an encrypted credential depicted in accordance with an illustrative embodiment.

Turning next to FIG. 6, a flowchart of a process for generating an encrypted credential is depicted in accordance with an illustrative embodiment. The process in FIG. 6 is an example of one manner in which step 540 in FIG. 5 can be implemented.

The process begins by generating a credential key (step 610). The credential key can be credential key 242, shown in block form in FIG. 2.

The process generates the encrypted credential by encrypting the credential with the credential key (step 620).

The process generates an encrypted key by encrypting the credential key with the public key associated with the audit engine (step 630). The process sends the encrypted key to the person (step 640), and terminates thereafter.

In one illustrative example, the encrypted key can be included in a manifest, such as manifest 246 of FIG. 2, that includes the encrypted key, an identity of issuer, and a category for the credential. The encrypted key is then sent to the person within the generated manifest. One or more of the credential and the manifest can be digitally signed using a private key of a cryptographic key pair associated with issuer.

Figure 7:
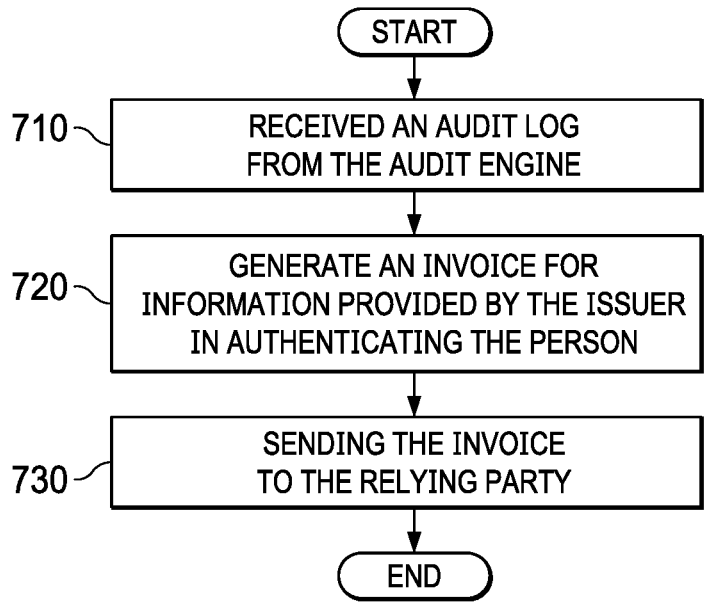
FIG. 7 is a flowchart of a process for generating an invoice for the use of a verified credential depicted in accordance with an illustrative embodiment.

Turning next to FIG. 7, a flowchart of a process for generating an invoice for the use of a verified credential is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in issuer 210 in computer system 206 in FIG. 2.

The process begins by receiving an audit log from an audit engine (step 710). The audit log provides a record of the manifest 246 received by the audit engine 202 from a relying party 218. The record includes an identity of the relying party 218 and the manifest 246.

The process generates an invoice for information 228 provided by issuer 210 in authenticating person (step 720). The invoice is generated based on the audit log received from the audit engine.

The process sends the invoice to the relying party (step 730), and terminates thereafter.

Figure 8:
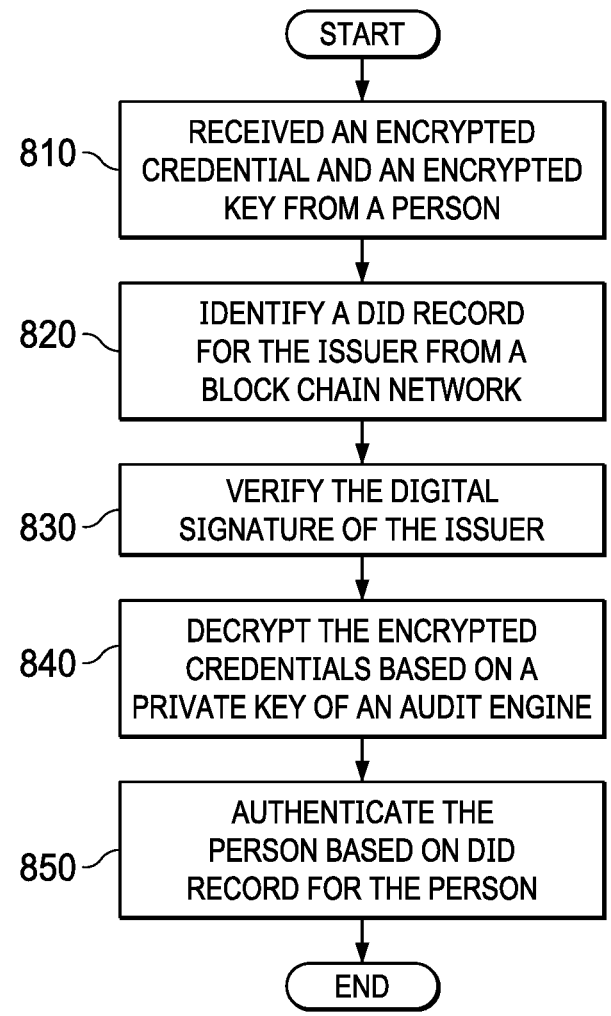
FIG. 8 is a flowchart of a process for authenticating a credential of a person depicted in accordance with an illustrative embodiment.

Turning next to FIG. 8, a flowchart of a process for authenticating a credential of a person is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in relying party 218 in computer system 206 in FIG. 2.

The process begins by receiving an encrypted credential 240 and an encrypted key 244 from a person 212 (step 810). Both the encrypted credential 240 and the encrypted key 244 include a digital signature of an issuer 210 of credential 214.

In one illustrative example, the process receives the encrypted key as part of a manifest, such as manifest 246 of FIG. 2. The manifest can include the encrypted key, an identity of the issuer, and a category for the credential.

The process identifies a decentralized identifier (DID) record for issuer 210 from a blockchain network 204 (step 820). The DID record 214 for issuer 210 includes a public key 220 of a cryptographic key pair 222 associated with issuer 210.

The process verifies by the digital signature of issuer 210 based on the public key 220 associated with issuer 210 (step 830).

The process identifies credential 214 by decrypting the encrypted credential 240 based on a private key 238 of a cryptographic key pair 222 associated with an audit engine 202 (step 840). The credential 214 reference a DID record 214 for person 212 recorded in the blockchain network 204.

The process authenticates person 212 based on the DID record 214 for person 212 (step 850), and terminates thereafter. The issuer 210 is unaware of the relying party 218. The issuer 210 is unaware of a public key 220 of the cryptographic key pair 222 associated with the audit engine 202 that was used to generate the encrypted credential 240.

Based on the authentication of the person, the relying party can provide a business service according to the credential 214 that were identified.

Figure 9:
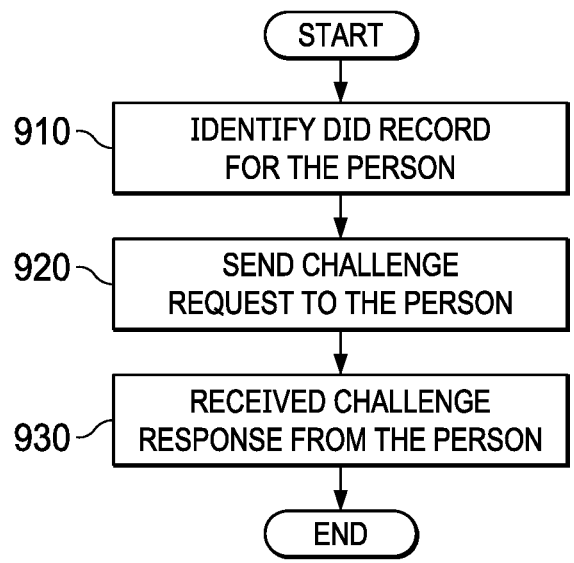
FIG. 9 is a flowchart of a process for authenticating a person is depicted in accordance with an illustrative embodiment.

Based on the use of the verified credential, the relying party may receive an invoice from issuer. The invoice is for information 228 provided by issuer 210 in authenticating person 212. The issuer can generate based on an audit log received from the audit engine, such as audit engine 202. The audit log provides a record of the manifest 246 received by the audit engine 202 from a relying party 218. Turning next to FIG. 9, a flowchart of a process for authenticating a person is depicted in accordance with an illustrative embodiment. The process in FIG. 9 is an example of one manner in which step 850 in FIG. 8 can be implemented.

The process begins by identifying a DID record 214 for person 212 in the blockchain network 204 (step 910). The DID record 214 for person 212 includes a public key 220 of a cryptographic key pair 222 associated with person 212.

The process sends a challenge request to person (step 920). The challenge request is generated based on the public key 220 associated with person 212.

The process receives a challenge response from person (step 930), and terminates thereafter. The challenge response successfully authenticates person. The challenge response is generated based on a private key 238 associated with person 212.

Figure 10:
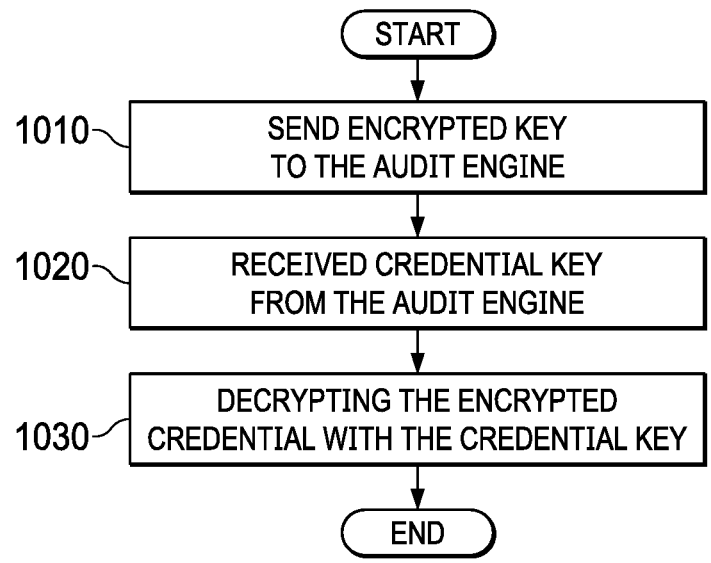
FIG. 10 is a flowchart of a process for identifying a credential that is encrypted by the public key associated with the audit engine is depicted in accordance with an illustrative embodiment.

Turning next to FIG. 10, a flowchart of a process for identifying a credential that is encrypted by the public key associated with the audit engine is depicted in accordance with an illustrative embodiment. The process in FIG. 9 is an example of one manner in which step 840 in FIG. 8 can be implemented.

The process begins by sending the encrypted key 244 to the audit engine 202 (step 1010). In one illustrative example, the encrypted key can be sent as part of a manifest that is received from the person to be identified.

In response to receiving the encrypted key, the audit engine 202 resolves a credential key 242 by decrypting, with the private key 238 associated with the audit engine 202, the encrypted key 244. The audit engine 202 is unaware of person 212 and the credential 214. The audit engine 202 generates a record of decrypting the credential key 242, wherein the record identifies issuer 210 and the relying party 218 but not person 212.

In one illustrative example, the process digitally signs the encrypted key prior to sending the encrypted key 244 to the audit engine 202. The encrypted key is signed using a private key 238 of a cryptographic key pair 222 associated with the relying party 218. this is one way for the audit engine to authenticate the relying party, and to support non-repudiation. In other embodiments, the authentication engine may utilize other acceptable methodologies to authenticate the relying party.

the process receives the credential key 242 from the audit engine 202 (step 1020). The process resolves the credential 214 by decrypting the encrypted credential with the credential key (step 1030), and terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
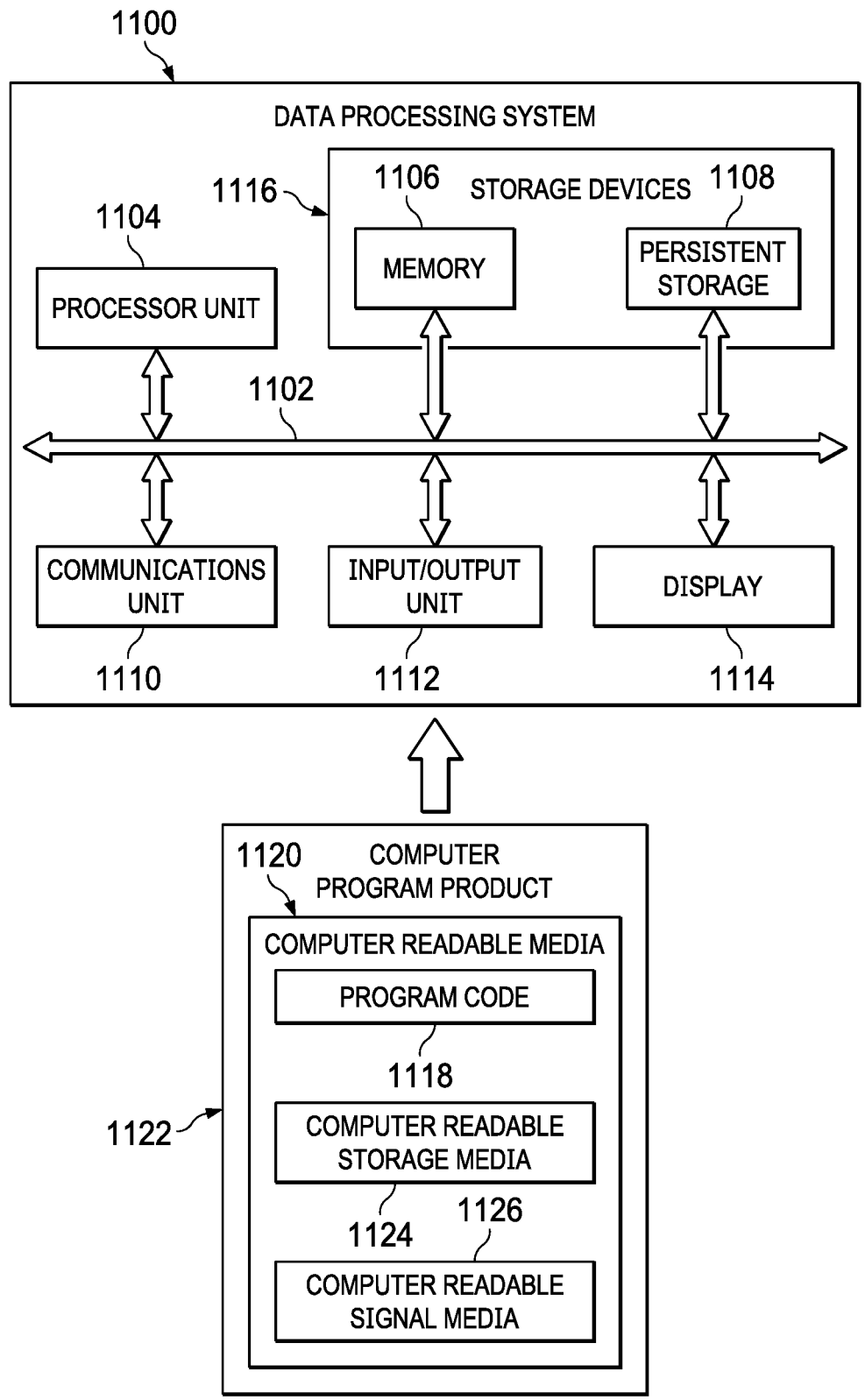
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, client devices 110, in FIG. 1. Data processing system 1100 can also be used to implement computer system 206 in FIG. 2.

In this illustrative example, data processing system 1100 includes communications framework 1102, which provides communications between processor unit 1104, memory 1106, persistent storage 1108, communications unit 1110, input/output (I/O) unit 1111, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor.

Memory 1106 and persistent storage 1108 are examples of storage devices 1116. A storage device is any piece of hardware that is capable of storing information 228, such as, for example, without limitation, at least one of data, program code in functional form, or other suitable information 228 either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118. The term "non-transitory" or "tangible", as used herein, is a limitation of the medium itself (i.e., tangible, not a signal) as opposed to a limitation on data storage persistency (e.g., RAM vs. ROM).

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, memory 1106, or portions thereof, may be incorporated in processor unit 1104 in some illustrative examples.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for authenticating a credential of a person, the method comprising:
   receiving, by a relying party, an encrypted credential and an encrypted key from the person, wherein the encrypted key is encrypted by a public key associated with an audit engine, and wherein both the encrypted credential and the encrypted key include a digital signature of an issuer of the credential;
   identifying, by the relying party, a decentralized identifier (DID) record for the issuer from a blockchain network, wherein the DID record for the issuer includes a public key of a cryptographic key pair associated with the issuer;
   verifying, by the relying party, the digital signature of the issuer based on the public key associated with the issuer;
   identifying, by the relying party, the credential by decrypting the encrypted credential based on a private key of a cryptographic key pair associated with an audit engine, wherein the credential references a DID record for the person recorded in the blockchain network, wherein identifying the credential further comprises:
   sending, by the relying party, the encrypted key to the audit engine, wherein the audit engine resolves a credential key by decrypting, with the private key associated with the audit engine, the encrypted key, wherein the audit engine is unaware of the person and the credential, and wherein the audit engine generates a record of decrypting the credential key, wherein the record identifies the issuer and the relying party but not the person;
   receiving, by the relying party, the credential key from the audit engine; and resolving, by the relying party, the credential by decrypting, with the credential key, the encrypted credential; and
   authenticating, by the relying party, the person based on the DID record for the person, wherein the issuer is unaware of the relying party, and wherein the issuer is unaware of the public key of the cryptographic key pair associated with the audit engine that was used to generate the encrypted credential.

2. The method of claim 1, further comprising:
   in response to authenticating the person, providing, by the relying party, a business service according to the credential that were identified.

3. The method of claim 1, further comprising:
   prior to sending the encrypted key to the audit engine, digitally signing, by the relying party with a private key of a cryptographic key pair associated with the relying party, the encrypted key.

4. The method of claim 1, wherein receiving the encrypted key further comprises:
   receiving, by the relying party, a manifest, wherein the manifest includes the encrypted key, an identity of the issuer, and a category for the credential;
   and wherein sending the encrypted key further comprises:
   sending, by the relying party, the manifest to the audit engine.

5. The method of claim 4, further comprising:
   receiving, by the relying party, an invoice from the issuer, wherein the invoice is for information provided by the issuer in authenticating the person, wherein the invoice is generated by the issuer based on an audit log received from the audit engine, wherein the audit log provides a record of the manifest received by the audit engine from a relying party.

6. The method of claim 1, wherein authenticating the person based on the public key associated with the person further comprises:
   identifying, by the relying party, a DID record for the person in the blockchain network, wherein the DID record for the person includes a public key of a cryptographic key pair associated with the person;
   sending, by the relying party, a challenge request to the person, wherein the challenge request is generated based on the public key associated with the person; and
   receiving, by the relying party, a challenge response from the person, wherein the challenge response successfully authenticates the person, wherein the challenge response is generated based on a private key associated with the person.

7. A credential management system comprising:
   a computer system; and
   a relying party in the computer system, wherein the relying party operates to:
   receive an encrypted credential and an encrypted key from a person, wherein the encrypted key is encrypted by a public key associated with an audit engine, and wherein both the encrypted credential and the encrypted key include a digital signature of an issuer of credential;
   identify a decentralized identifier (DID) record for the issuer from a blockchain network, wherein the DID record for the issuer includes a public key of a cryptographic key pair associated with the issuer;
   verify the digital signature of the issuer based on the public key associated with the issuer;
   identify the credential by decrypting the encrypted credential based on a private key of a cryptographic key pair associated with an audit engine, wherein the credential reference a DID record for the person recorded in the blockchain network wherein the credential references a DID record for the person recorded in the blockchain network, wherein identifying the credential further comprises:
   sending the encrypted key to the audit engine, wherein the audit engine resolves a credential key by decrypting, with the private key associated with the audit engine, the encrypted key, wherein the audit engine is unaware of the person and the credential, and wherein the audit engine generates a record of decrypting the credential key, wherein the record identifies the issuer and the relying party but not the person;
   receiving the credential key from the audit engine; and
   resolving the credential by decrypting, with the credential key, the encrypted credential; and
   authenticate the person based on the DID record for the person, wherein the issuer is unaware of the relying party, and wherein the issuer is unaware of the public key of the cryptographic key pair associated with the audit engine that was used to generate the encrypted credential.

8. The credential management system of claim 7, wherein the relying party further operates to:
in response to authenticating the person, provide a business service according to the credential that were identified.

9. The credential management system of claim 7, further comprising:
prior to sending the encrypted key to the audit engine, digitally signing, with a private key of a cryptographic key pair associated with the relying party, the encrypted key.

10. The credential management system of claim 7, wherein receiving the encrypted key further comprises:
receiving a manifest, wherein the manifest includes the encrypted key, an identity of the issuer, and a category for the credential;
and wherein sending the encrypted key further comprises:
sending the manifest to the audit engine.

11. The credential management system of claim 10, wherein the relying party further operates to:
receive an invoice from the issuer, wherein the invoice is for information provided by the issuer in authenticating the person, wherein the invoice is generated by the issuer based on an audit log received from the audit engine, wherein the audit log provides a record of the manifest received by the audit engine from a relying party.

12. The credential management system of claim 7, wherein authenticating the person based on the public key associated with the person further comprises:
identifying a DID record for the person in the blockchain network, wherein the DID record for the person includes a public key of a cryptographic key pair associated with the person;
sending a challenge request to the person, wherein the challenge request is generated based on the public key associated with the person; and
receiving a challenge response from the person, wherein the challenge response successfully authenticates the person, wherein the challenge response is generated based on a private key associated with the person.

13. A computer program product for authenticating a credential of a person, the computer program product comprising:
a computer readable storage media;
program code, stored on the computer readable storage media, for receiving an encrypted credential and an encrypted key from a person, wherein the encrypted key is encrypted by a Public key associated with an audit engine, and wherein both the encrypted credential and the encrypted key include a digital signature of an issuer of the credential;
program code, stored on the computer readable storage media, for identifying a decentralized identifier (DID) record for the issuer from a blockchain network, wherein the DID record for the issuer includes a public key of a cryptographic key pair associated with the issuer;
program code, stored on the computer readable storage media, for verifying digital signature of the issuer based on the public key associated with the issuer;
program code, stored on the computer readable storage media, for identifying credential by decrypting the encrypted credential based on a private key of a cryptographic key pair associated with an audit engine wherein the credential references a DID record for the person recorded in the blockchain network, wherein identifying the credential further comprises:
sending the encrypted key to the audit engine, wherein the audit engine resolves a credential key by decrypting, with the private key associated with the audit engine, the encrypted key, wherein the audit engine is unaware of the person and the credential, and wherein the audit engine generates a record of decrypting the credential key, wherein the record identifies the issuer and the relying party but not the person;
receiving the credential key from the audit engine; and
resolving the credential by decrypting, with the credential key, the encrypted credential; and
program code, stored on the computer readable storage media, for authenticating the person based on the DID record for the person, wherein the issuer is unaware of a relying party, and wherein the issuer is unaware of the public key of the cryptographic key pair associated with the audit engine that was used to generate the encrypted credential.

14. The computer program product of claim 13, further comprising:
program code, stored on the computer readable storage media, for providing, in response to authenticating the person, a business service according to the credential that were identified.

15. The computer program product of claim 13, further comprising:
program code, stored on the computer readable storage media, for digitally signing, by the relying party with a private key of a cryptographic key pair associated with the relying party, the encrypted key prior to sending the encrypted key to the audit engine.

16. The computer program product of claim 13, wherein the program code for receiving the encrypted key further comprises:
program code for receiving a manifest, wherein the manifest includes the encrypted key, an identity of the issuer, and a category for the credential;
and wherein the program code for sending the encrypted key further comprises:
program code for sending the manifest to the audit engine.

17. The computer program product of claim 16, further comprising:
program code, stored on the computer readable storage media, for receiving an invoice from the issuer, wherein the invoice is for information provided by the issuer in authenticating the person, wherein the invoice is generated by the issuer based on an audit log received from the audit engine, wherein the audit log provides a record of the manifest received by the audit engine from a relying party.

18. The computer program product of claim 13, wherein the program code for authenticating the person based on the public key associated with the person further comprises:
program code for identifying a DID record for the person in the blockchain network, wherein the DID record for the person includes a public key of a cryptographic key pair associated with the person;
program code for sending a challenge request to the person, wherein the challenge request is generated based on the public key associated with the person; and
program code for receiving a challenge response from the person, wherein the challenge response successfully authenticates the person, wherein the challenge response is generated based on a private key associated with the person.

\* \* \* \* \*